United States Patent
Lamkins et al.

(10) Patent No.: US 7,516,194 B1
(45) Date of Patent: Apr. 7, 2009

(54) METHOD FOR DOWNLOADING HIGH-VOLUMES OF CONTENT FROM THE INTERNET WITHOUT ADVERSELY EFFECTING THE SOURCE OF THE CONTENT OR BEING DETECTED

(75) Inventors: Nick Lamkins, Portland, OR (US); Rick O'Brien, Eugene, OR (US); James Dirksen, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 10/443,110

(22) Filed: May 21, 2003

Related U.S. Application Data

(60) Provisional application No. 60/382,779, filed on May 21, 2002.

(51) Int. Cl.
 *G06F 15/16* (2006.01)
(52) U.S. Cl. .................. 709/218; 709/217; 709/219
(58) Field of Classification Search ......... 709/217–219
 See application file for complete search history.

(56) References Cited

U.S. PATENT DOCUMENTS

| | | | |
|---|---|---|---|
| 5,603,029 A | | 2/1997 | Aman et al. |
| 5,701,451 A | * | 12/1997 | Rogers et al. ............. 707/1 |
| 6,173,322 B1 | * | 1/2001 | Hu ............................ 709/224 |
| 6,185,619 B1 | | 2/2001 | Joffe et al. |
| 6,240,447 B1 | * | 5/2001 | Banga et al. .............. 709/217 |
| 6,343,323 B1 | * | 1/2002 | Kalpio et al. .............. 709/229 |
| 6,397,246 B1 | * | 5/2002 | Wolfe ......................... 709/217 |
| 6,728,748 B1 | | 4/2004 | Mangipudi et al. |
| 6,757,675 B2 | * | 6/2004 | Aiken et al. ................ 707/3 |
| 6,775,743 B2 | * | 8/2004 | Patel ........................... 711/118 |
| 2002/0007404 A1 | * | 1/2002 | Vange et al. ............... 709/217 |
| 2002/0065922 A1 | | 5/2002 | Shastri |
| 2003/0061299 A1 | * | 3/2003 | Brown et al. ............... 709/214 |
| 2005/0038874 A1 | * | 2/2005 | Ramaswamy et al. ...... 709/219 |
| 2005/0240622 A1 | | 10/2005 | Cheung |

OTHER PUBLICATIONS

Rodriguez et al., "Dynamic Parallel Access to Replicated Content in the Internet," IEEE/ACM Transactions on Networking (TON), Aug. 2002, pp. 455-465, vol. 10, Issue 4, ACM Press, New York, U.S.A.

Gabber et al., "Consistent, yet anonymous, Web Access with LPWA," Communications of the ACM, Feb. 1999, pp. 42-47, vol. 42, Issue 2, ACM Press, New York, U.S.A.

(Continued)

*Primary Examiner*—Paul H Kang
*Assistant Examiner*—Mohamed Ibrahim
(74) *Attorney, Agent, or Firm*—Senniger Powers LLP

(57) ABSTRACT

A method and system for downloading high volumes of content from the Internet without adversely affecting the source of the content or being detected. A director server processes data received from a data source to generate a list of addresses for content to download. The director server assigns a portion of the list of addresses to one or more puller servers. Puller servers initiate requests to download content that corresponds to their assigned list of addresses. A proxy gateway server receives the download request for content, and downloads the content via various Internet Protocol addresses.

22 Claims, 5 Drawing Sheets

OTHER PUBLICATIONS

Evans et al., "A Web-Based Resource Migration Protocol Using WebDAV," Proceedings f the Eleventh International Conference on World Wide Web, 2002, pp. 263-271, ACM Press, New York; U.S.A.
Dantzig, Architecture and Design of High Volume Web Sites: (A Brief History of IBM Sport and Event Web Sites), Proceedings of the 14th International Conference on Software Engineering and Knowledge Engineering, 2002, pp. 17-24, ACM Press, New York, U.S.A.
Berghel et al., "Anonymizing the Net, Sanitizing Packets for Fun and Profit," Communications of the ACM, Apr. 2003, pp. 15-20, vol. 46, No. 4, ACM Press, New York, U.S.A.

* cited by examiner

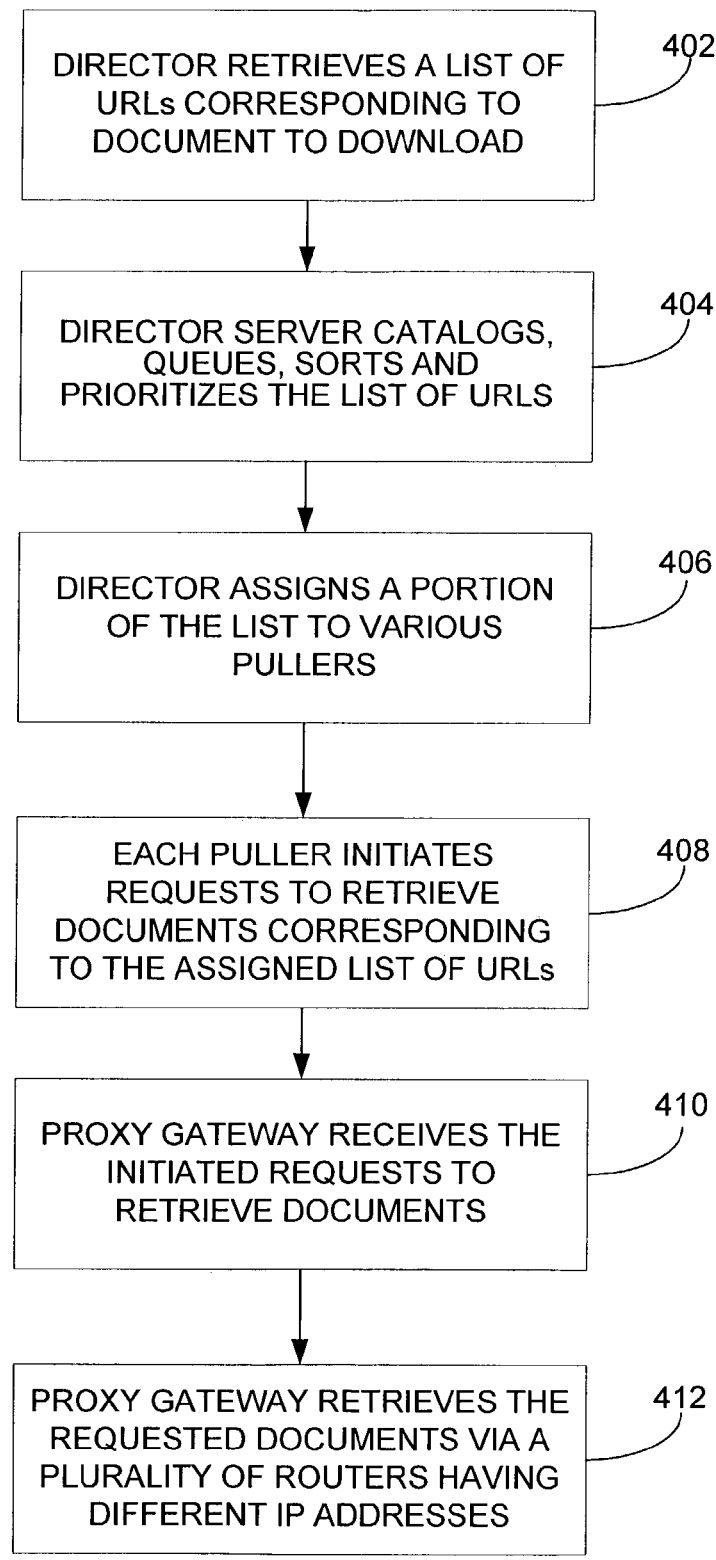

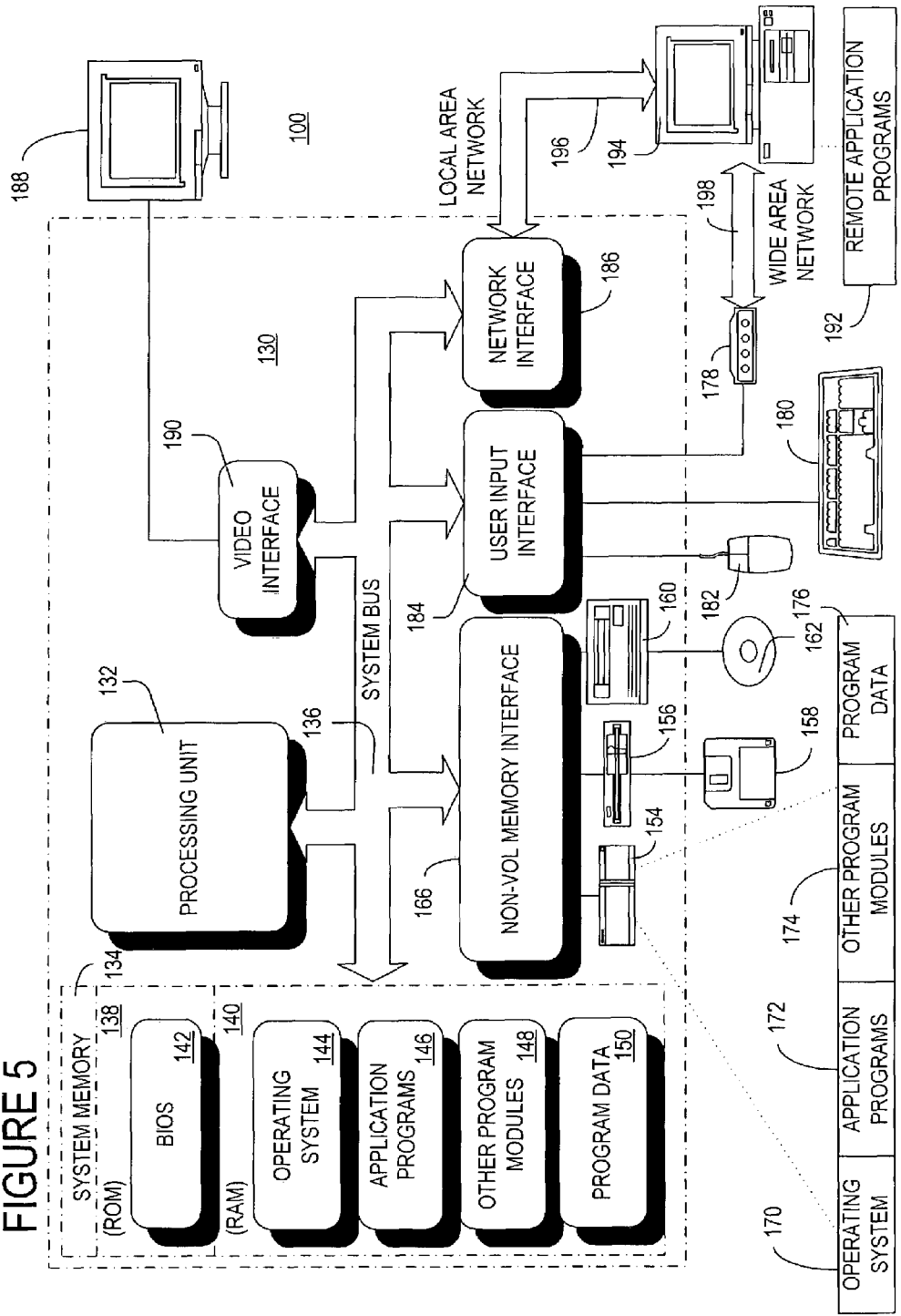

METHOD FOR DOWNLOADING HIGH-VOLUMES OF CONTENT FROM THE INTERNET WITHOUT ADVERSELY EFFECTING THE SOURCE OF THE CONTENT OR BEING DETECTED

TECHNICAL FIELD

The present invention relates to the field of computer network environments. In particular, this invention relates to a system and method for downloading high volumes of content from a content server without adversely affecting the source of the content, or being detected.

BACKGROUND OF THE INVENTION

Along with the rise of massively distributed data storage and data availability on the Internet has come the necessity for various organizations to download the data in its various forms ("Content") for offline analysis and processing. Theses applications include indexing of content, analyzing of data, archiving of content, and many others. The only effective way to download theses numerous content sets, some of which are very large, is to use automated content pullers connected to high-bandwidth connections.

Unfortunately, there are often adverse consequences to downloading content with automated content pullers. One such adverse consequence of downloading content with automated content pullers is the potential to deny service to other content pullers. For example, if one puller downloading all the content from any one source is connected to a high-bandwidth connection, it could effectively prevent that source from serving its content to other applications trying to access the data. This situation should be avoided because it can create ill-will with the provider of the content, stop other users from accessing the content, and can temporarily or permanently harm the equipment that the content is served from.

Another adverse consequence is that operators of sites containing content frequently implement Intrusion Detection Systems (IDS) which are put in place to detect when a server containing the content is under an attack. While an IDS is a valuable tool in determining if an attack is under way, if it is not configured correctly it can incorrectly report that any kind of automated content collection is an attack. This stems from the fact that the IDS attempts to detect and report patterns of activity. For example, repeatedly accessing a server containing content, even if spread over large time periods and for non-disruptive purposes, will trip most baseline IDSs and trigger an alarm. Responding to these false alarms is time consuming for the administrators of the servers containing the content, and can result in ill will toward organizations attempting to download the content, regardless of the intentions of such organizations.

For these reasons, a system for downloading high volumes of content without adversely affecting the source of the content, or being detected is desired to address one or more of these and other disadvantages.

SUMMARY OF THE INVENTION

The invention meets the above needs and overcomes one or more deficiencies in the prior art by providing an improved system and method for efficiently downloading high volumes of content from content servers via the Internet without overwhelming the content server and/or without triggering intrusion alerts. In one embodiment, the invention utilizes a director server to generate a list of URL addresses for content to download from a content server. The director server assigns a portion of the list of URL addresses to one or more puller servers. Each puller server initiates requests to download content that corresponds to its assigned list of URL addresses. A proxy gateway server receives the download request for content via an internal interface, and downloads content via various external interfaces. By downloading the content via the various external interfaces, it appears to the content server that requests for content were initiated from various sources, rather than a single source. The invention yields significant reductions in intrusion alerts and operating costs, and yields significant improvements in content retrieval time.

In accordance with one aspect of the invention, a system is provided for downloading a plurality of documents from a content server. Each of the plurality of documents is identified by a different document address. The content server is linked to a plurality of routers that each have a different network address. The system includes a director for creating a list of document addresses that correspond to the plurality of documents. The system further includes a puller that is responsive to the director for receiving the list of document addresses, and for initiating requests to retrieve documents from the content server that correspond to the list of addresses. The system further includes a proxy gateway that is responsive to the puller for receiving the requests to retrieve documents. The proxy gateway retrieves documents that correspond to the list of document addresses from the content server via the plurality of routers.

In accordance with another aspect of the invention, a method is provided for retrieving a plurality of documents from a content server. The method includes creating a list of document addresses that correspond to the plurality of documents to be downloaded. The method further includes initiating requests to retrieve documents that correspond to the list of document addresses from the content server. The method further includes assigning a portion of the documents corresponding to the initiated requests to be retrieved via each of a plurality of network addresses. The method further includes retrieving the requested documents from the content server via the plurality of network addresses. Each network addresses appears to indicate a location from which the document requests were initiated.

In accordance with another aspect of the invention, a computer readable medium includes instructions for downloading a plurality of documents from a content server in response to download requests. Retrieving instructions retrieve download requests for documents via an internal interface. Distributing instructions distribute the retrieved download requests among a plurality of external interfaces. Each external interface has a different IP address for communicating with the content server. Downloading instructions download documents corresponding to retrieved download requests from the content server via the plurality of external interfaces Alternatively, the invention may comprise various other methods and apparatuses.

Other features will be in part apparent and in part pointed out hereinafter.

BRIEF DESCRIPTION OF THE DRAWINGS

FIG. 4 is an exemplary flow chart illustrating a method of downloading documents according to the exemplary embodiment described in reference to FIG. 2.

FIG. 5 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
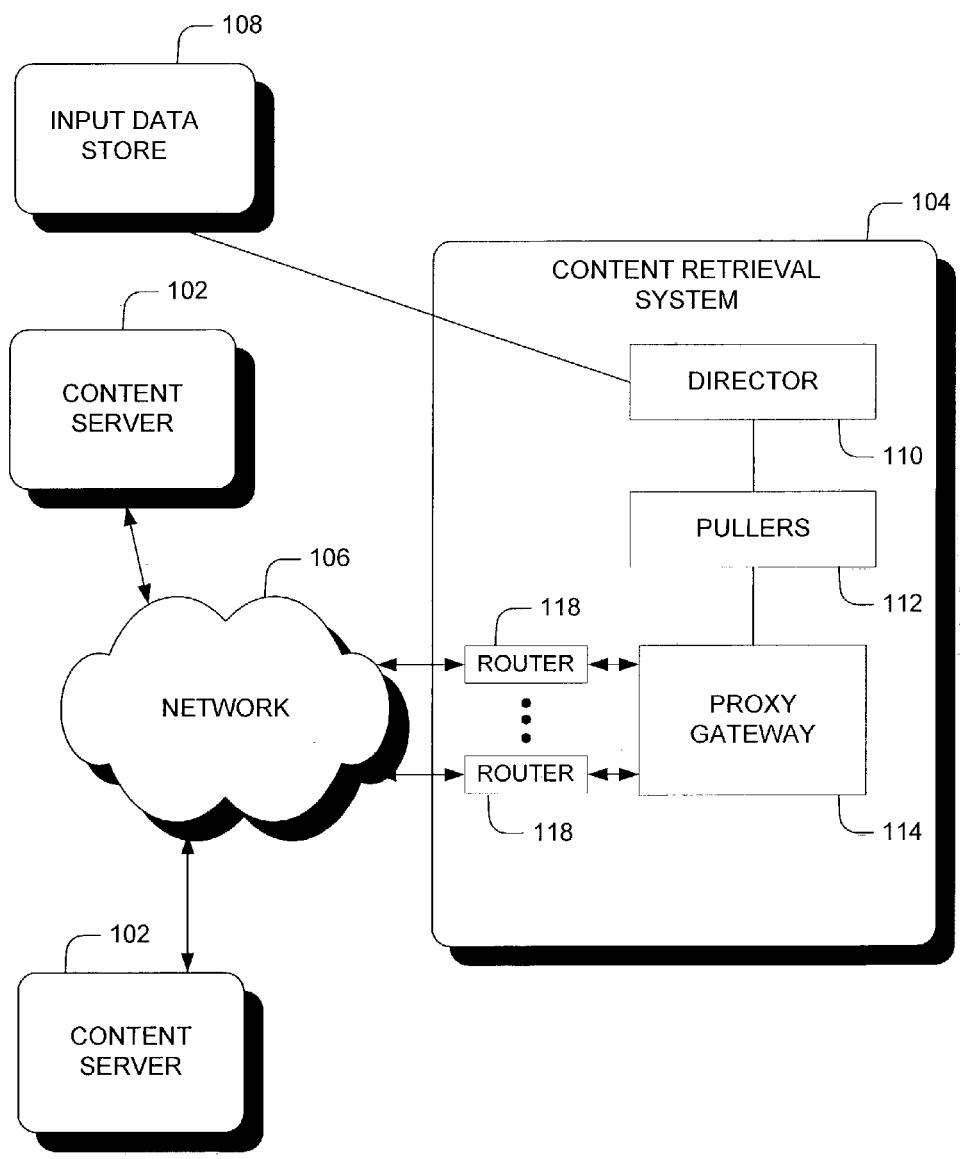
FIG. 1 is an illustration of an exemplary network environment in which the present invention may be utilized to download high volumes of content from a content server.

Referring now to the drawings, FIG. 1 illustrates an exemplary network environment in which the present invention may be utilized to download high volumes of content from a content server 102. In this instance, FIG. 1 diagrammatically shows cross-internet collaboration between a content retrieval system 104 and one or more content servers 102.

Content servers 102 store and/or provide access to a plurality of HyperText Markup Language (HTML) files or documents such as web pages. Content servers 102 are also referred to as "web servers" or "network servers." In the example of FIG. 1, the content retrieval system 104 downloads high volumes of content from content servers 102 without overwhelming the servers 102 with download requests, or triggering alerts to administrators of the servers 102 containing the content.

The content retrieval system 104 is coupled to a data communication network 106 in FIG. 1. In this example, the network 106 is the Internet (or the World Wide Web). However, the present invention can be applied to any data communication network including a local area network (LAN), a wide area network (WAN), or a value added network (VAN). Multiple content servers 102 are also coupled to network 106. In turn, the content retrieval system 104 can access each of the content servers 102 via network 106. In this embodiment, content servers 102 and the content retrieval system 104 communicate data among themselves using the Hypertext Transfer Protocol (HTTP), a protocol commonly used on the Internet to exchange information.

As shown in FIG. 1, an input data store 108 is coupled to the content retrieval system 104. In this embodiment, the input data store 108 receives and stores location information regarding content to be downloaded from content server 102. More specifically, the input data store 108 receives and stores a list of document addresses identifying the location of documents to be downloaded. For example, the list of document addresses may be a list of uniform resource locators (URLs). As known to those skilled in the art, the URL specifies the name of the server on which a particular resource (e.g., HTML document) resides, and the path to the HTML document on that server. In one embodiment, the input data store 108 receives the list of document addresses from a user (not shown) seeking to download large volumes of content from one or more content servers. In an alternate embodiment, the input data store 108 receives the list of document addresses from an affiliate server (not shown) that provides access to web sites known to accumulate links relevant to content, or other databases associated with the location of content.

The content retrieval system 104 of the present invention involves one or more servers or a network of servers that interact to download high volumes of content such as web pages from content servers 102. The network of servers includes a director 110, one or more pullers 112, and a proxy gateway 114. The director 110 processes data received from the input data store 108 to generate a list of addresses for web pages to download. The director 110 assigns a portion of the list of addresses to the one or more pullers 112. In one embodiment, and as described in more detail in reference to FIG. 2, the director 110 assigns addresses to the one or more pullers 112 based on a site identification (ID) as determined from the address. Pullers 112 initiate requests to retrieve web pages corresponding to their assigned list of addresses. The proxy gateway 114 receives the request for web pages, and downloads web pages via various routers 118 each having different Internet Protocol (IP) or network addresses. The proxy gateway 114 essentially acts as a proxy for the content request, and it will appear to the content server 102 that the request to download content came from the proxy gateway 114, and not the one or more pullers 112.

Figure 2:
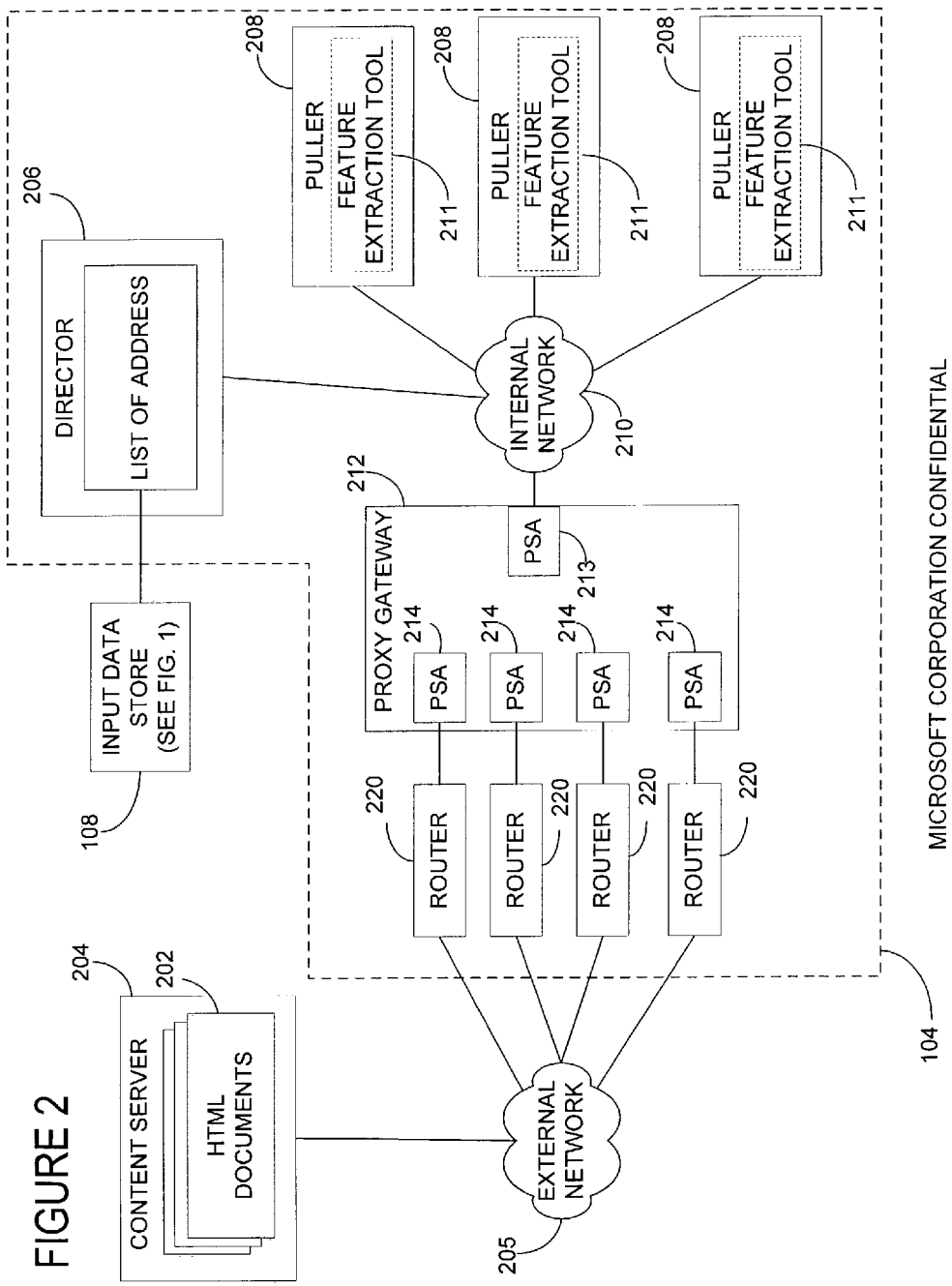
FIG. 2 is an exemplary block diagram illustrating basic components of a content retrieval system for downloading documents from a content server according to one embodiment of the invention.

Referring next to FIG. 2, an exemplary block diagram illustrates one embodiment of components of a content retrieval system 104 in combination with an input data store 108, a content server 204, and an external communication network 205 for downloading HTML documents 202 from the content server 204 according to the invention.

A director 206, according to the invention, executes a computer program having instructions for creating a list of URLs that correspond to documents 202 to download from the content server 204. In this case, the director 206 creates the list of document addresses by cataloging, queuing, sorting, and prioritizing a list of URLs that have been provided from a source such as a user, an affiliate server, or database. For instance, the director 206 may be linked to an input data store 108 such as described above in reference to FIG. 1.

Pullers 208 are linked to the director 206 via an internal communication network 210. The internal communication network 210 can be a local area network (LAN), a wide area network (WAN), the Internet, or any other data communication network. The pullers 208 and director 206 communicate data among themselves via the internal communication network 210. Each puller 208 requests downloading assignments from the director 206, and each is assigned a portion of the list of URLs from the director 206. In one embodiment, the director assigns URLs to each puller 208 according to a base "site-id." For example, the URL "msn.com/news/sports/index.html" would be sorted and stored by "msn.com" the "site-id" of the URL. Since multiple documents are often requested from a single content server, if more than one puller were assigned document addresses for the same server 204, multiple overlapping requests could be sent to that content server 204, and potentially overwhelm the server with request 204. After assigning URLs to each of the pullers 208, the director 206 sets the state of the assigned URLs as "checked out," and for each assigned URL the director 206 stores the identification (i.e., IP address) of the pullers 208 to which the URL was assigned. In one embodiment, pullers 208 create their own list of URLs corresponding to documents 202 to download. For example, after pulling a document 202 identified by a URL assigned by the director 206, the puller 208 examines the content of the document and attempts to identify locations of other documents referenced within the pulled document. In one such embodiment, the puller 208 includes a feature extraction tool 211 that extracts text features and context features from each of the documents retrieved by a proxy gateway (see below). The feature extraction tool 211 can be an HTML parser that takes an input HTML file for a web page and outputs a feature list for the page. By extracting features such as links and URLs, the location of documents that are referenced in the HTML file can be identified and added to the list of URLs already assigned to the puller 208.

Each of the pullers 208 initiates content requests to retrieve documents 202 from the content server 204 corresponding to their assigned and/or created list of URLs. Each content request (sometimes called HTTP page request) generally has two parts, a header and a body. The request header includes an HTTP command (sometimes called a method) that tells the content server 204 the action it wants to perform. In this case, a Get command is used to request content (i.e., documents) from locations on the content server 204 identified by the assigned list of URLs (e.g., <Get msn.com/news/sports/index.html>). The header may also include information that identifies the location from which the request was initiated. As known to those skilled in the art, when the content server 204 receives an HTTP page request, the originating IP address of the request is made available by the simple act of connecting to the server 204 with the TCP/IP or Transmission Control Protocol/Internet Protocol. The term "TCP/IP" refers to the layered combination of TCP and IP protocols, on which many higher-level application protocols (like HTTP) have been built. The following is an example of an HTTP page request sent by the puller 208 to a server 204:

GET http://msn.com/news/sports/index.html HTTP/1.0
User-Agent: Mozilla/4.0 (compatible; MSIE 4.0; Windows NT; . . . /1.0)
Host: msn.com
Connection: close In this example, "msn.com" identifies the server where the particular page (i.e., document) is stored. The "/news/sports/" is a folder, and identifies the location of the requested content on the server 204. The "index.html" indicates the particular file or document to retrieve. The http://msn.com/news/sports/index.html is the document requested and the protocol is HTTP version 1.0. The User-Agent header contains information about the client program originating the request, and can be used, for example, to identify the browser software.

In this embodiment, pullers 208 are configured to prevent the content sever 204 from being overwhelmed when pullers 208 have adjacent URLs (i.e., documents located on the same server) in their assigned list of URLs for which to generate requests. As described above, the location of the content server 204 can be identified from the URL address. Moreover, when the puller 208 generates a request (e.g., HTTP page request) to retrieve content from a particular content server 204, the request is time stamped and stored by the puller 208. To avoid overlapping requests, when the director 206 provides the puller 208 a downloading assignment that corresponds to a content server 204 currently being accessed by the puller 208, the 208 puller queues the requests to be started only when all previous requests have been completed. In other words, after the puller 208 generates a request for a particular URL, the puller 208 will not generate requests for another URL identifying the same server 204 until a predetermined amount of time (e.g., six seconds) has elapsed from the time that corresponds to the time stamp of the previously generated request.

A proxy gateway 212 interfaces with pullers 208 via the internal communication network 210, and receives the initiated requests to retrieve documents 202 corresponding to the list of URLs assigned to each of the pullers 208. The proxy gateway 212 executes proxy server applications 213, 214 having computer executable instructions for retrieving documents 202 corresponding to the list of URLs assigned to the pullers 208. As known to those skilled in the art, at least a portion of a URL address has a corresponding Internet Protocol (IP) address assigned, for example, by a Domain Name Service (DNS) that provides the unique address of a computer or server on the Internet at a given point in time. By converting the URL to the IP address, the proxy gateway 212 can retrieve an HTML document 202 such as a web page from the content server 204 via the external communication network 205. In this example, the external communication network 205 is the Internet (or the World Wide Web). The proxy gateway 212 is configured with multiple instances of proxy server applications (PSA) 213, 214. PSA 213 is installed with internal interface software for communicating with the internal communication network ("Internal Interfaces"), and PSA 214 is installed with external interface software for communicating with the external communication network 205 ("External Interfaces"). The PSA 213 installed with internal interface software is configured to round robin or assign document requests received from pullers 208 to the external interfaces based on the time the requests were generated. In other words, document requests are assigned to external interfaces in the order in which they were generated. The proxy gateway 212 executes each PSA 214 to retrieve documents corresponding to assigned document requests from the content server 204 via the external communication network 205 and routers 220. Moreover, the PSA 214 installed with external interface software is configured to use one distinct IP address for accessing the Internet and communicating with the content server 204

Routers 220 are linked directly to the proxy gateway 212, and are linked to the content server 204 via the external communication network 205. As known to those skilled in the art, routers 220 are typically located where two or more networks connect. In this case, routers 220 are used to connect the internal communication network (LAN, WAN or Internet) to the external communication network 205 (e.g., Internet). The Internet Service Provider assigns each of the routers 220 an IP address. Routers 220 and content servers 204 can communicate data among themselves using HTTP. Each router 220 is linked to the proxy gateway 212 via external interfaces, and each of the IP addresses assigned to the routers 220 can be used by the corresponding PSA 214 to forward the request for documents to the content server 204. In other words, the PSA 214 modifies the information contained in the header of the request generated by the puller such that the header identifies the request as being initiated by the router 220 to which it is interfaced. As described above, the originating IP address of a request received by the content server 204 is made available by the simple act of connecting to the server 204 with the TCP/IP protocol. In this instance, the server 204 is connected to the external interfaces of the proxy gateway 212 via the routers 220. Thus, it appears to the content server 204 that a particular request was generated via the IP address of the router 220 assigned the particular request, rather than the IP address assigned to the puller 208 that generated the request.

Figure 3:
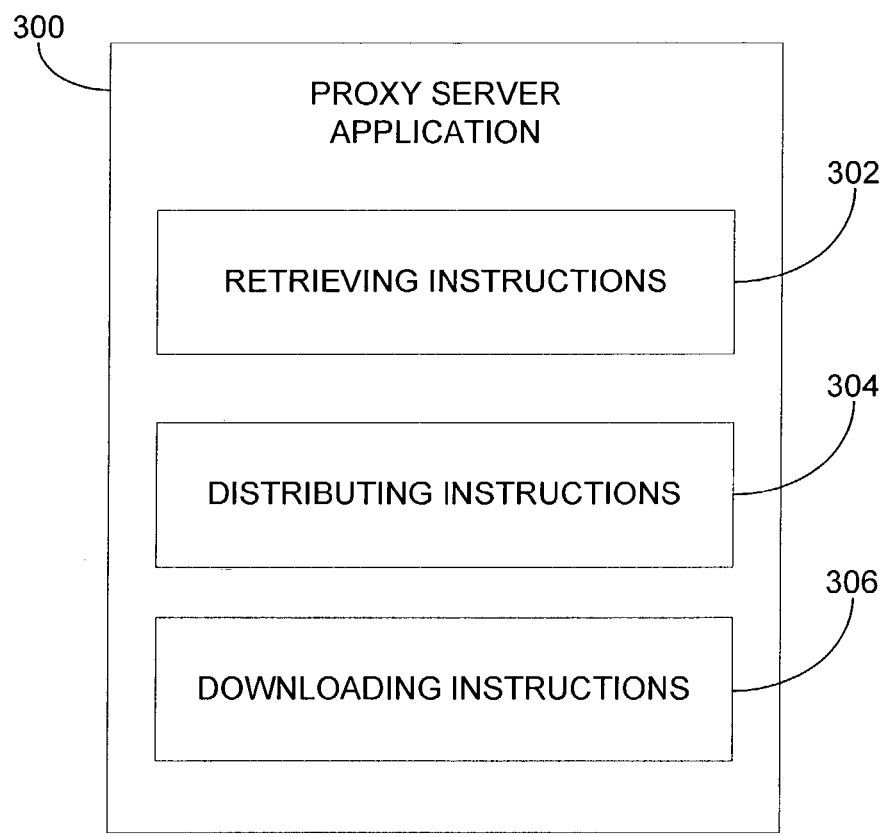
FIG. 3 is an exemplary block diagram illustrating components of a proxy server application comprising computer executable instructions for downloading a plurality of documents according to one embodiment of the invention.

Referring now to FIG. 3, an exemplary block diagram illustrates components of a proxy server application 300 comprising computer executable instructions for downloading a plurality of documents corresponding to a list of URLs. Retrieving instructions 302 include instructions for communicating with an internal communication network via an internal interface to retrieve download requests from pullers for documents corresponding to the list of URLs. For example, the retrieving involves communicating with one or more pullers (See FIG. 2) via an internal communication network (e.g., LAN, WAN, or Internet) to retrieve Get commands that request content from locations identified by the list of URL (e.g., Get <msn.com/news/sports/index.html>). Distributing instructions 304 include instructions for distributing the document download requests among a plurality of external interfaces. For example, the distributing involves assigning a portion of the document download requests to each of a plurality of external interface such as described above in reference to FIG. 2 (e.g., PSA 213). In this case, each external interface is identified by a different IP address when communicating with the content server via the Internet. Downloading instructions 306 include instructions for downloading documents that correspond to the retrieved download request from the content server via the external interface to which the request was assigned. For example, the downloading instructions include modifying information contained in the header of an HTTP page request such that the header identifies the request as being initiated via the external interface to which it is assigned (e.g., PSA 214).

Referring next to FIG. 4, an exemplary flow chart illustrates a method of downloading documents according to an exemplary embodiment. A director retrieves a list of document addresses for documents to download from a content server at 402. At 404, the director catalogs, queues, sorts, and prioritizes the list of URLs that correspond to the plurality of documents. The director assigns a portion of the list of the URLs to various pullers at 406. At 408 the pullers initiate requests to retrieve documents that correspond to the assigned list of URLs. A proxy gateway receives the initiated request to retrieve documents at 410. At 412, the proxy gateway retrieves the requested documents from the content server via a plurality of routers that each has a different network address (e.g., IP address).

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 3 to download a plurality of documents from a content server in response to download requests.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for downloading a plurality of documents from a plurality of content servers, said content servers being linked to a plurality of routers that each have a different network address, said system comprising:

a plurality of pullers;
a director for:
creating a list of URLs of the plurality of documents to be downloaded from the plurality of content servers, each of the plurality of said documents being identified by a different URL; and
assigning a portion of the list of URLs to each of the pullers such that each portion assigned to a particular puller includes all documents to be retrieved from a single content server wherein no two pullers initiate requests to adjacent URLs, wherein adjacent URLs identify documents located on the same content server;
wherein each of the plurality of pullers is responsive to the director for:
receiving the assigned portion of the list of URLs;
queuing requests to retrieve documents identified by the received portion of the list of URLs wherein the requests having different URLs are queued by the puller;
determining if the URL of a first queued request is adjacent to the URL of a document being currently downloaded;
if the URL of the first queued request is adjacent to the URL of a document being currently downloaded, waiting until the currently downloading document has been received before initiating the first queued request to avoid overlapping requests to the content server;
if the URL of the queued request is not adjacent to the URL of a document being currently downloaded, initiating the first queued request; and
a proxy gateway responsive to each of the pullers for receiving the initiated requests to retrieve documents, and for retrieving documents corresponding to the list of URL from the content servers via the routers.

2. The system of claim 1, wherein the plurality of routers are linked to the content servers via an external communication network.

3. The system of claim 2, wherein the proxy gateway includes:
an internal interface for interfacing with an internal communication network and for receiving the requests to retrieve documents; and
a plurality of external interfaces for interfacing with the external communication network via the plurality of routers.

4. The system of claim 3, wherein the internal communication network is a local area network (LAN), a wide area network (WAN), or the Internet.

5. The system of claim 3, wherein the external communication network is the Internet.

6. The system of claim 3, wherein the proxy gateway appears to initiate the requests to retrieve documents via one or more of the external interfaces, and wherein each external interface is identified as having the network address of the router to which it is interfaced.

7. The system of claim 6, wherein the proxy gateway is responsive to the received requests for executing a first proxy application to assign one or more of the requests to retrieve documents to each of the plurality of external interfaces, and wherein the proxy gateway is responsive to the one or more assigned requests for executing a second proxy application to retrieve one or more documents corresponding to the one or more assigned requests.

8. The system of claim 1, wherein each of the plurality of routers is assigned a network address by an Internet service provider.

9. The system of claim 1, wherein each of the plurality of pullers is further responsive to the director for examining content within the retrieved documents to identify additional URLs which are added to the list of URLs, wherein the additional URLs identify additional documents to be retrieved.

10. The system of claim 1, further comprising a feature extraction tool for extracting features such as links and URLs to identify additional URLs of documents that are referenced in an HTML file.

11. The system of claim 1, wherein the director creates the list of URLs by cataloging, queuing, sorting, and prioritizing the list of URLs that correspond to the plurality of documents.

12. A method for retrieving a plurality of documents from a content server, comprising:
creating a list of URLs corresponding to the plurality of documents to be downloaded, each of said documents being identified by a different URL;
queuing requests to retrieve documents corresponding to the list of URLs from the content server wherein requests to the content server having different URLs are queued;
determining if the URL of a first queued request is adjacent to the URL of a document being currently downloaded, wherein adjacent URLs identify documents located on the same content server;
if the URL of the first queued request is adjacent to the URL of a document being currently downloaded, waiting until the current document has been downloaded by the content server before initiating one of the queued requests to avoid overlapping requests to the content server;
if the URL of the queued request is not adjacent to the URL of a document being currently downloaded, then initiating one of the queued requests;
assigning a portion of documents corresponding to the initiated requests to be retrieved via each of a plurality of network addresses; and
retrieving the requested documents from the content server via the plurality of network addresses, wherein each of the network addresses appears to indicate a location from which the document requests were initiated.

13. The method of claim 12, wherein the list of URLs corresponding to the plurality of documents is provided by a user, an affiliate server, or links within retrieved documents.

14. The method of claim 12, wherein creating a list of URLs includes cataloging, queuing, sorting, and prioritizing a list of URLs corresponding to the plurality of documents to be retrieved.

15. The method of claim 12, wherein retrieving the requested documents includes retrieving a portion of the requested documents from the content server via each of the plurality of network addresses.

16. The method of claim 12, further comprising:
examining content within retrieved documents;
identifying additional URLs for documents from the examined content; and
adding the identified additional URLs the to the list of URLs to be retrieved.

17. A computer readable storage medium having computer executable instructions for downloading a plurality of documents from a content server in response to download requests, comprising:
retrieving instructions for:
retrieving download requests for documents via an internal interface, each of said documents being identified by a different URL;
queuing download requests to retrieve documents from the content server wherein requests to the content server having different URLs are queued; and
determining if the URL of a first queued request is adjacent to the URL of a document being currently downloaded, wherein adjacent URLs identify documents located on the same content server;
if the URL of the first queued request is adjacent to the URL of a document being currently downloaded, waiting until the current document has been downloaded by the content server before initiating one of the queued requests to avoid overlapping requests to the content server; and
if the URL of the first queued request is adjacent to the URL of a document being currently downloaded, initiating one of the queued requests;
distributing instructions for distributing the initiated download requests among a plurality of external interfaces, and wherein each external interface has a different IP address for communicating with the content server; and downloading instructions for downloading documents corresponding to the initiated download requests from the content server via the plurality of external interfaces.

18. The computer readable storage medium of claim 17, wherein the distributing instructions assign one or more of the requests to retrieve documents to each of the plurality external interfaces.

19. The computer readable storage medium of claim 17, wherein the downloading instructions modify information contained in the assigned request to identify the request as being initiated via the external interface to which the request is assigned.

20. The computer readable storage medium of claim 17, wherein the download requests for documents are retrieved via a local area network (LAN), wide area network (WAN), or the Internet.

21. A system for downloading a plurality of documents from a plurality of content servers, said content servers being linked to a plurality of routers that each have a different network address, said system comprising:
   a plurality of pullers;
   a director for:
      creating a list of document addresses corresponding to the plurality of documents to be downloaded, each of the plurality of said documents being identified by a different document address; and
      assigning a portion of the list of document addresses to each of the pullers such that each portion assigned to a particular puller includes all documents to be retrieved from one content server wherein no two pullers are assigned document addresses to be retrieved from the same content server;
   wherein a first puller is responsive to the director for:
      receiving a first portion of the list of document addresses;
      queuing a first request to retrieve a first document based on a first document address and queuing a second request to retrieve a second document based on a second document address, said first and second document address included in the list of document addresses;
      initiating the first queued request to retrieve the first document from a first content server based on the first document address;
      based on the second document address of the second queued request, determining the content server identified by the second document address;
      if the determined content server is the first content server and the first content server is in the process of retrieving the first document, waiting until the first document has been received by the first content server before initiating the second queued request to avoid overlapping requests to the first content server;
      if the determined content server is not the first content server or the first content server is not in the process of retrieving the first document, initiating the second queued request to retrieve the second document from the determined content server; and
   a proxy gateway responsive to each of the pullers for receiving the initiated requests to retrieve documents, and for retrieving documents corresponding to the list of document addresses from the content servers via the routers.

22. The system of claim 21, wherein a first puller is responsive to the director for:
   receiving a second portion of the list of document addresses;
   queuing a third request to retrieve a third document based on a third document address and queuing a fourth request to retrieve a fourth document based on a fourth document address, said third and fourth document address included in the second portion of the list of document addresses;
   initiating the third queued request to retrieve the third document from a third content server based on the third document address;
   based on the fourth document address of the fourth queued request, determining the content server identified by the fourth document address;
   if the determined content server is the third content server and the third content server is in the process of retrieving the third document, waiting until the third document has been received by the third content server before initiating the fourth queued request to avoid overlapping requests to the third content server;
   if the determined content server is not the third content server or the third content server is not in the process of retrieving the third document, initiating the fourth queued request to retrieve the fourth document from the determined content server.

* * * * *